United States Patent
Solis-Martinez (10) Patent No.: US 6,748,883 B2
(45) Date of Patent: Jun. 15, 2004

(54) CONTROL SYSTEM FOR CONTROLLING THE FEEDING AND BURNING OF A PULVERIZED FUEL IN A GLASS MELTING FURNACE

(75) Inventor: Iván Jorge Solis-Martinez, Nuevo León (MX)

(73) Assignee: Vitro Global, S.A., Givisiez (CH)

( * ) Notice: Subject to any disclaimer, the term of this patent is extended or adjusted under 35 U.S.C. 154(b) by 0 days.

(21) Appl. No.: 10/261,968

(22) Filed: Oct. 1, 2002

(65) Prior Publication Data

US 2004/0060490 A1 Apr. 1, 2004

(51) Int. Cl.[7] .............................. F23D 1/00; F23N 5/00; F23K 3/00
(52) U.S. Cl. ................................ 110/347; 110/101 CF; 110/101 CC; 110/187; 110/191
(58) Field of Search ..................... 110/101 CF, 101 CA, 110/101 CB, 101 CC, 347, 185, 187, 191

(56) References Cited

U.S. PATENT DOCUMENTS

| | | | |
|---|---|---|---|
| 4,006,003 A | * | 2/1977 | Daiga ........................... 65/135 |
| 4,250,816 A | * | 2/1981 | Angevine ............. 110/101 CF |
| 4,252,551 A | * | 2/1981 | Nishimura ..................... 65/28 |
| 4,311,102 A | * | 1/1982 | Kolze et al. ................... 110/103 |
| 4,335,683 A | * | 6/1982 | Criswell et al. ............. 122/4 D |
| 4,373,451 A | * | 2/1983 | Gardner et al. ........ 110/101 CC |
| 4,389,388 A | | 6/1983 | Goforth et al. |
| 4,389,949 A | * | 6/1983 | Heep ..................... 110/101 CF |
| 4,602,575 A | * | 7/1986 | Grethe ......................... 110/347 |
| 4,631,080 A | * | 12/1986 | Westra et al. ................... 65/134 |
| 4,758,118 A | * | 7/1988 | Rachner et al. ............... 406/24 |
| 4,857,284 A | | 8/1989 | Hauk |
| 4,894,122 A | | 1/1990 | Lazcano-Navarro et al. |
| 5,053,210 A | | 10/1991 | Buxel et al. |
| 5,147,438 A | * | 9/1992 | Castelain et al. .............. 65/135 |
| 5,259,864 A | | 11/1993 | Greenwalt |
| 5,285,735 A | * | 2/1994 | Motoi et al. .......... 110/101 CB |
| 5,447,547 A | * | 9/1995 | Goldfarb et al. ........... 65/134.1 |
| 5,636,240 A | | 6/1997 | Tsai et al. |
| 6,101,847 A | * | 8/2000 | Shamp et al. ............... 65/134.4 |
| 6,101,959 A | * | 8/2000 | Bronicki et al. ............. 110/347 |

\* cited by examiner

Primary Examiner—Kenneth Rinehart
(74) Attorney, Agent, or Firm—Abelman, Frayne & Schwab (57) ABSTRACT

A control system for controlling the storing, feeding and burning of a pulverized fuel in a glass melting furnace, wherein a series of burners are arranged one in front of the other to carry out combustion and non-combustion cycles during a glass melting process. Pulverized fuel feeding systems are provided, which are filled up and emptied out with the pulverized material for providing a constant flow of the pulverized fuel to each of the burners dunng the glass melting process. The control system including control means for monitoring and controlling the filled up and discharge out of said pulverized fuel feeding system based on the measurement and monitoring of the amount of pulverized fuel that is being storaged and feeded by the pulverized fuel feeding system. Control means are provided for monitoring at least one operating variable involved on the glass melting furnace, the control means detecting a series of different variable during the glass melting process. And means for controlling the alternation of the combustion and non-combustion cycles to each burner, based on the monitoring and feeding of the pulverized fuel to burner and in base to the operating variables of the glass melting process.

17 Claims, 7 Drawing Sheets

CONTROL SYSTEM FOR CONTROLLING THE FEEDING AND BURNING OF A PULVERIZED FUEL IN A GLASS MELTING FURNACE

BACKGROUND OF THE INVENTION

1. Field of the Invention

The present invention is related to a control system for controlling the feeding and burning of a pulverized fuel in a glass melting furnace and, more specifically to a control system that feeds pulverized fuel in a glass melting furnace.

2. Related Prior Art

Melting glass has been done for different kinds of furnaces as well as types of fuels, depending on the final characteristics of the product and also regarding the thermal efficiency of the melting and refining processes. Unit melter furnaces have been used to melt glass (by means of gas fuel), these furnaces have several burners along the sides of the furnace, the whole unit looks like a close box where there is a chimney that can be placed either in the beginning of the feeder or at the very end of the furnace, it means, going downstream. However there is an enormous heat loss in the glass leaving high-temperature operating furnaces. At 2500° F., for example, the heat in the flue gases is 62 percent of the heat input for a natural gas fired furnace.

In order to take advantage of the remaining heat of the flue gases, a more sophisticated and expensive design come out, named as the regenerative furnace. It is well known that, in order to operate a regenerative glass melting furnace, a plurality of gas burners are associated with a pair of sealed regenerators disposed side-by-side. Each regenerator has a lower chamber, a refractory structure above the lower chamber and an upper chamber above the structure. Each regenerator has its corresponding port connected to the respective upper chamber with a melting and refining chamber of the furnace. The burners are arranged to burn fuel, such as natural gas, liquid petroleum, fuel oil or other gaseous or liquid fuels which are suitable for use in the glass melting furnace and thereby supply heat for melting and refining the glass making materials in the chamber. The melting and refining chamber is fed with glass making materials at one end thereof at which is located a doghouse and has a molten distributor disposed at the other end thereof, which comprises a series of ports through which molten glass may be removed from the melting and refining chamber.

The burners may be mounted in a number of possible configurations, for example a through-port configuration, a side-port configuration or an under-port configuration. Fuel, e.g. natural gas, is fed from the burner into the incoming stream of pre-heated air called "combustion air" also, coming from each regenerator during the firing cycle or reversal sequence, and the resultant flame and products of combustion produced in that flame extend across the surface of the melting glass, and transfer heat to that glass in the melting and refining chamber.

In operation, the regenerators are cycled alternately between combustion air and exhaust heat cycles. Every 20 minutes, or 30 minutes, depending on the specific furnaces, the path of the flame is reversed. The objective of each regenerator is to store the exhausted heat, which allows a greater efficiency and a higher flame temperature that could not be achieved with normal ambient air.

For operating the glass melting furnace, the fuel is fed to the burners and, the combustion air supplied is controlled by measuring the airflow generated at the exit of the combustion fan and at the top of the structure, the, quantity of oxygen and combustible material present to ensure that within the melting chamber or at points along the melting chamber, the combustion air fed is less than that required for complete combustion of the fuel being supplied.

In the past, the fuel used to melt glass was fuel oil, coming from distillation of petroleum. For many years this kind of fuel was used, but the tighten of environmental regulations have been pushing for reduction of fuel oil, since this kind of oil has impurities coming from the petroleum crude oil, such as, sulphur, vanadium, nickel, and some other heavy metals. This kind of fuel oil produce pollutants such as SOx, NOx and particulates. Recently the glass industry has been using natural gas as a cleaner fuel. All the heavy metals and sulphur coming in the liquid stream of petroleum residuals from distillation are not contained in natural gas. However, the high temperature produced in the flame of natural gas has been very effective for producing more NOx than other pollutants. In this sense, a lot of effort has been done in order to develop low NOx burners for firing natural gas. Additionally, different technologies have been developed to prevent the NOx formation. An example of this is the Oxy-fuel Technology, which utilizes oxygen instead of air for the combustion process. This technology has the inconvenient of requiring a unit melter furnace with a special preparation of the refractories since air infiltration need to be prevented. The use of oxygen also produce a higher temperature flame, but in the absence of nitrogen the NOx production is drastically reduced.

Another inconvenient for the oxy-fuel process is the cost of the oxygen itself. In order to make it cheaper it needs to place an oxygen plant besides the furnace in order to feed the required oxygen by the melting process.

However, the continuing upward spiral of energy costs (primarily natural gas) have forced the major float glass manufacturers to add "surcharges" to truckloads of flat glass. Natural gas prices have increased over 120% this year (in Mexico only or elsewhere), far above previous estimates.

The general consensus among Glass Industry insiders is that Distributors will be forced to take a close look at these new 'surcharges', and most likely be forced to pass them along.

Taking into account the previous art, the present invention is related to apply different technologies to reduce the melting cost, using a solid fuel coming from the petroleum residuals of distillation towers, such as petroleum coke, in order to be used for glass production in an environmentally clean way The main difference of this type of fuel regarding fuel oil and natural gas is the physical state of the matter, since fuel oil is a liquid phase, natural gas is a gas phase while petroleum coke for instance is a solid. Fuel oil and petroleum coke have the same kinds of impurities, since both of them are coming from residuals of distillation tower of crude oil. The significant difference is the amount of impurities contained in each of these. Petroleum coke is produced in three types of different processes called delayed, fluid and flexi. The residuals from the distillation process are placed in drums and then heated up to from 900° to 1000° Fahrenheit degrees for up to 36 hours in order to take out most of the remaining volatiles from the residuals. The volatiles are extracted from the top of the coking drums and the remaining material in the drums is a hard rock make if around 90 percent of carbon and the rest of all the impurities from the crude oil used. The rock is extracted from the drums using hydraulic drills and water pumps.

A typical composition of petroleum coke is given as follows carbon about 90%; hydrogen about 3%; nitrogen from about 2% to 4%; oxygen about 2%; sulphur from about 0.05% to 6%; and others about 1%.

Use of Petroleum Coke

Petroleum solid fuels have already been used in cement and steam power generation industries. According to the Pace Consultants Inc. the use of petroleum coke in the year 1999 for cement and power generation were between the 40% and 14% respectively.

In both industries, the burning of petroleum coke is used as a direct fire system, in which the atmosphere produced by the combustion of the fuel is in direct contact with the product. In the case of cement production, a rotary kiln is needed in order to provide a thermal profiled require by the product. In this rotary kiln, a shell of molten cement is always formed avoiding the direct contact of the combustion gases and flames with the refractories of the kiln, avoiding attack thereof. In this case, the calcined product (cement) absorbs the combustion gases, avoiding the erosive and abrasive effects of vanadium, $SO_3$ and NOx in the rotary kiln.

However, due to the high sulfur content and vanadium the use of petroleum coke as fuel is not common in the glass industry, due to the negative effect on the structure of the refractories and in addition the environmental problems.

Problems on the Refractories

The glass industry use several kinds of refractory materials, and most of them are used to accomplish different functions, not only the thermal conditions but also the chemical resistance and mechanical erosion due to the impurities contained by fossil fuels.

Using a fossil fuel as the main energy source represents an input to the furnace of different kinds of heavy metals contained in the fuel, such as: vanadium pentoxide, iron oxide, chromium oxide, cobalt, etc. In the process of combustion most of the heavy metals evaporate because of the, low vapor pressure of the metal oxide and the high temperature of the melting furnace.

The chemical characteristic of the flue gases coming out of the furnace is mostly acid because of the high content of sulphur from the fossil fuel. Also the vanadium pentoxide presents an acid behavior such as the sulphur flue gases. Vanadium oxide is one of metals that represents a source of damage to basic refractories, because the acid behavior of this oxide in gaseous state. It is well known that the vanadium pentoxide strongly reacts with calcium oxide forming a dicalcium silicate at 1275 celsius degrees.

The dicalcium silicate continues the damage to form a phase of merwinite and the to monticelite and finally to forsterite, which reacting with vanadium pentoxide to form a low melting point of tricalcium vanadate.

The only way to reduce the damage caused to basic refractories is the reduction of the amount of calcium oxide in the main basic refractory in order to avoid the production of dicalcium silicate that continues reacting with vanadium pentoxide until the refractory may fail.

On the other hand, the main problem with the use of the petroleum coke is related with the high sulfur and vanadium content, which have a negative effect on the structure of the refractories in the furnaces. The foremost requirement characteristics of a refractory is to withstand exposure to elevated temperature for extended periods of time. In addition it must be able to withstand sudden changes in temperature, resist the erosive action of molten glass, the corrosive action of gases, and the abrasive forces of particles in the atmosphere.

The effect of the vanadium on the refractories has been studied in different the papers, i.e. Roy W. Brown and Karl H. Sandmeyer in the paper "Sodium Vanadate's effect on superstructure refractories", Part I and Part II, The Glass Industry Magazine, November and December 1978 issues. In this paper the investigators tested different cast refractories which were centered on overcoming the vanadium attack in the flowing cast compositions, such as alumina-zirconia-silica (AZS), alpha-beta alumina, alpha alumina and beta alumina, which are commonly used in glass tank superstructures.

J. R. Mclaren and H. M. Richardson in the paper "The action of Vanadium Pentoxide on Aluminum Silicate Refractories" describe a series of experiments in which cone deformation were carried out on sets of ground samples from bricks with alumina content of 73%, 42% and 9%, each sample containing admixtures of vanadium pentoxide, alone or in combination with sodium oxide or calcium oxide.

The discussion of the results were focused on the action of Vanadium Pentoxide, the action of Vanadium Pentoxide with Sodium Oxide and the Action of Vanadium Pentoxide with Calcium oxide. They concluded that:

1.— Mullite resisted the action of vanadium pentoxide at temperatures up to 1700° C.
2.— No evidence was found of the formation of crystalline compounds or solid solutions of vanadium pentoxide and alumina or of vanadium pentoxide and silica.
3.— Vanadium pentoxide may act as a mineralizer during the slagging of alumino-silicate refractories by oil ash, but it is not a major slagging agent.
4.— Low-melting compounds are formed between vanadium pentoxide and sodium or calcium oxides, specially the former.
5.— In reactions between either sodium or calcium vanadates and aluminosilicates, lower-melting-point slags are formed with bricks high in silica than with bricks highs in alumina.

T. S. Busby and M. Carter in the paper "The effect of $SO_3$, $Na_2SO_4$ and $V_2O_5$ on the bonding minerals of basic refractories", Glass Technology Vol. 20, No. April, 1979, tested a number of spinels and silicates, the bond minerals of basic refractories, in a sulphurous atmosphere between 600 and 1400° C., both with and without additions of $Na_2SO_4$ and $V_2O_5$. It was found that some MgO or CaO in these minerals was converted to the sulfate. The reaction rate was increased by the presence of $Na_2SO_4$ or $V_2O_5$. Their results indicate that the CaO and MgO in basic refractories can be converted to the sulfate if they are used in a furnace where sulphur is present in the waste gases. The formation of calcium sulfate occurs below 1400° C. and that of magnesium sulfate below about 1100° C.

However, as was described of the above, the effect of the vanadium on the refractories produce a great amount of problems in the glass furnaces, which has not solved in its totallity Petroleum Coke and the Environment Another problem of the use of the petroleum coke is related with the environment. The high content of sulphur and metals as nickel and vanadium produced by the combustion of the petroleum coke have provoked environmental problems. However, already exist developments for reduce or desulphurate the petroleum coke with a high content of sulphur (over 5% by weight). For example, the U.S. Pat. No. 4,389,388 issued to Charles P. Go forth on Jun. 21, 1983, concerns to the desulfurization of petroleum coke. Petroleum coke is processed to reduce the sulfur content. Ground coke is contacted with hot hydrogen, under pressurized conditions, for a residence time of about 2 to 60 seconds. The desulfurized coke is suitable for metallurgical or electrode uses.

The U.S. Pat. No. 4,857,284 issued to Rolf Hauk on Aug. 15, 1989, is related to a Process for removing sulphur from the waste gas of a reduction shaft furnace. In this patent it is described a novel process for removing the sulphur contained in a gaseous compound by absorbtion from at least part of the waste gas of a reduction shaft furnace for iron ore. The waste gas is initially cleaned in a scrubber and cooled, followed by desulphurizabon, during which the sulphur absorbing material is constituted by part of the sponge iron produced in the reduction shaft furnace. Desulfurization advantageously takes place at a temperature in the range 30° C. to 60° C. It is preferably carried out on the $CO_2$ separated from the blast furnace gas and the blast furnace gas part used as export gas.

The U.S. Pat. No. 4,894,122 issued to Arturo Lazcano-Navarro, et al, on Jan. 16, 1990, is related to a process for the desulphurization of residuals of petroleum distillation in the form of coke particles having an initial sulphur content greater than about 5% by weight. Desulphurization is effected by means of a continuous electrothermal process based on a plurality of sequentially connected fluidized beds into which the coke particles are successively introduced. The necessary heat generation to desulphurize the coke particles is obtained by using the coke particles as an electrical resistance in each fluidized bed by providing a pair of electrodes that extend into the fluidized coke particles and passing an electrical current through the electrodes and through the fluidized coke particles. A last fluidized bed without electrodes is provided for cooling the desulphurized coke particles after the sulphur level has been reduced to less than about 1% by weight.

The U.S. Pat. No. 5,259,864 issued to Richard B. Greenwalt on Nov. 9, 1993, is related to a method for both disposing of an environmentally undesirable material comprising petroleum coke and the sulfur and heavy metals contained therein and of providing fuel for a process of making molten iron or steel preproducts and reduction gas in a melter gasifier having an upper fuel charging end, a reduction gas discharging end, a lower molten metal and slag collection end, and means providing an entry for charging ferrous material into the melter gasifier; introducing petroleum coke into the melter gasifier at the upper fuel charging end; blowing oxygen-containing gas into the petroleum coke to form at least a first fluidized bed of coke particles from the petroleum coke; introducing ferrous material into the melter gasifier through the entry means, reacting petroleum coke, oxygen and particulate ferrous material to combust the major portion of the petroleum coke to produce reduction gas and molten iron or steel preproducts containing heavy metals freed from combustion of the petroleum coke and a slag containing sulfur freed from combustion of the petroleum coke.

An additional factor to be considered in the glass industry is the control of the environment mainly the air pollution. The melting furnace contributes over 99% of both particulates and gaseous pollutants of the total emissions from a glass plant. The fuel waste gas from glass melting furnaces consists mainly of carbon dioxide, nitrogen, water vapor, sulphur oxides and nitrogen oxides. The waste gases released from melting furnaces consist mainly of combustion gases generated by fuels and of gases arising from the melting of the batch, which in turn depends on chemical reactions taking place within this time. The proportion of batch gases from exclusively flame-heated furnaces represents 3 to 5% of the total gas volume.

The proportion of the air-polluting components in the fuel waste gas depends on the type of the firing fuel, its heating value, the combustion air temperature, the burner design, the flame configuration, and the excess of air supply. The sulphur oxides in the waste gases of glass melting furnaces originated from the fuel used, as well as from the molten batches.

Various mechanisms have been proposed that include volatilization of these metal oxides and as hydroxides. Whatever the case, it is well known as the result of chemical analysis of the actual particulate matter, that more than 70% of the materials are sodium compounds, about 10% to 15% are calcium compounds, and the balance are mostly magnesium, iron, silica and alumina.

Another important considerations in the glass melting furnace is the emission of $SO_2$. The emission of $SO_2$ is a function of the sulfur introduced in the raw materials and fuel. During the time of furnace heating such as after a rise in production level, an abundance of $SO_2$ is given off. The emissions rate of $SO_2$ ranges from about 2.5 pounds per ton of glass melted to up to 5 pounds per ton. The concentration of $SO_2$ in the exhaust is generally in the 100 to 300 ppm range for melting with natural gas. While using high sulfur fuel, approximately 4 pounds of $SO_2$ per ton of glass for every 1% of sulfur in the fuel is added.

On the other hand, the formation of NOx as result of combustion processes has been studied and described by a number of authors (Zeldovich, J. The oxidation of Nitrogen in Combustion and explosions. Acta. Physiochem. 21 (4) 1946; Edwards, J. B. Combustion: The formation and emissions of trace species. Ann Arbor Science Publishers, 1974. p-39). These were recognized and by the Emissions Standards Division, Office of Air Quality Planning and Standards, USEPA, in their report on "NOx Emissions from glass manufacturing" include Zeldovich on homogeneous NOx formation and Edwards with his presentation of empirical equations. Zeldovich developed rate constants for the formation of NO and $NO_2$ as the result of high temperature combustion processes.

Finally under normal operating condition, where flames are adjusted properly and the furnace is not starved for combustible air, very little CO or other residuals from incomplete combustion of fossil fuel are found in the exhaust. The gas concentration of these species will be less than 100 ppm, probably lower than 50 ppm, with a production rate of less than 0.2%/ton. The control for these pollutants is simply a proper combustion set up.

Processing techniques for the reduction of gaseous emissions are essentially restricted to the proper selection of firing fuels and raw materials, as well as to furnace design and operation. The U.S. Pat. No. 5,053,210 issued to Michael Buxel et al, on Oct. 1, 1991, describes a method and apparatus for the purification of flue gases, particularly for the desulphurization of and $NO_x$-elimination from flue gas by multistage adsorption and catalytic reaction in gravity-flow moving beds of granular, carbon-bearing materials contacted by a transverse steam of the gas, in which a minimum of two moving beds are arranged in series with reference to the gas route so that $NO_x$-elimination takes place in the second or any downstream moving bed. Where large volumes of flue gas from industrial furnaces must be purified, purification is adversely affected by the formation of gas streaks with widely varying sulphur dioxide concentrations. This disadvantage is eliminated in that the prepurified flue gas leaving the first moving bed and having a locally variable sulphur dioxide concentration gradient is subjected to repeated mixing before ammonia is added as reactant for $NO_x$-elimination.

The U.S. Pat. No. 5,636,240 issued to Jeng-Syan et al, on Jun. 3, 1997, is related to an air pollution control process and apparatus for glass furnaces for use in the furnace's waste gas outlet including passing the waste gases through a spray type neutralization tower to remove sulphates in the waste gases by spraying an absorbent (NaOH) to reduce the opacity of exhaust gas, and employing a pneumatic powder feeding device to feed flyash or calcium hydroxide periodically in a path between the spray type neutralization tower land a bag house to maintain normal functioning of the filter bag in the bag house.

Considering all the above, the U.S. patent application Ser. No. 09/816254 of the same applicant of the present invention is related to a method and'system for feeding and for burning pulverized petroleum coke in a glass melting furnace. In said invention, pulverized petroleum coke of type composed of carbon, sulfur, nitrogen, vanadium, iron and nickel is burned in a glass melting furnace of side-port type for melting glass raw materials for the manufacture of glass sheets or containers. Means are provided for supplying the pulverized fuel in at least a burner that is arranged by each one of a plurality of first and second side ports of a glass melting region of said glass melting furnace, for burning the pulverized fuel during cycles of melting glass, said glass melting furnace including refractory means at regenerative chambers of a glass melting furnace for resisting the erosive action of the melting glass, the corrosive action of combustion gases and the abrasive forces of particles in the atmosphere provoked by the burning of said pulverized fuel in the furnace. Finally, means for controlling the air pollution in a waste gas outlet after that the combustion of the pulverized fuel in the glass melting furnace has been carried out, said means for controlling the air pollution reducing the emissions of sulfur, nitrogen vanadium, iron and nickel compounds at the atmosphere.

However, in order to control the feeding and the burning of the pulverized fuel in the glass melting furnace during cycles of melting glass, the present invention is related to a control system for controlling the feeding and burning of said pulverized fuel in the glass melting furnace. The control is done through a continuous monitoring of the different variables or parameters involved in the process such as, gas flow in each burner, pulverized fuel feeding velo city; blower velocity; blower pressure; transportation air flow; furnace internal pressure; gases extraction velocity in the chimney; gases pressure in the exit and entrance of the environment control system; furnace temperature; temperature in the combustion chambers; and the temperature profile in the furnace, in order to analyze the behavior of the furnace, when petroleum coke is used. All these factors are monitored and synchronized by means of a programmable controller in order to carried out the combustion air and exhaust heat cycles in the furnace, which are alternate every 20 minutes, or 30 minutes, depending on the specific furnaces. The automatic cycles also can be carried out by means for the monitoring of the temperature in the furnace, in accordance at preestablished temperature cycles in the programmable controller.

SUMMARY OF THE INVENTION

In accordance with the present invention is a first objective of the present invention to provide a control system for feeding pulverized fuel in a glass melting furnace, which automatically controls the feeding of the pulverized fuel in the furnace.

Is another objective of the present invention, to provide a control system for feeding pulverized fuel in a glass melting furnace, which monitors and controls all the variables of the glass melting process in order to carried out a synchronized operation of the fuel, the combustion air and the exhaust gases cycles in the glass furnace.

Another objective of the present invention is to provide a control system for feeding pulverized fuel in a glass melting furnace, which allows a coordinated operation sequence among all different systems that interact along the whole process of storing, handling, transporting, feeding, burning and disposing of the pulverized fuel in the glass melting process. The interaction of control system takes place between the combustion control system with a feeding control system, a melter control system, an environmental control system, a waste handling control system, and a storage and transportation control system, in order to carry out the data interchange of all the variables manipulated and detected in the different stages of the process and equipments and for feeding the pulverized fuel to a plurality of burners that are associated with a pair of sealed regenerators of a regenerative glass melting furnace.

Another objective of the present invention is to provide a control, system for feeding pulverized fuel in a glass melting furnace, wherein the burners can be arranged in the melting chamber for burning petroleum coke, gas or fuel oil.

These and other objectives and disadvantages of the present invention will be evident to the experts in the field from the following detailed description of the invention, which is illustrated in the attached drawings.

DETAILED DESCRIPTION OF THE INVENTION

Figure 1:
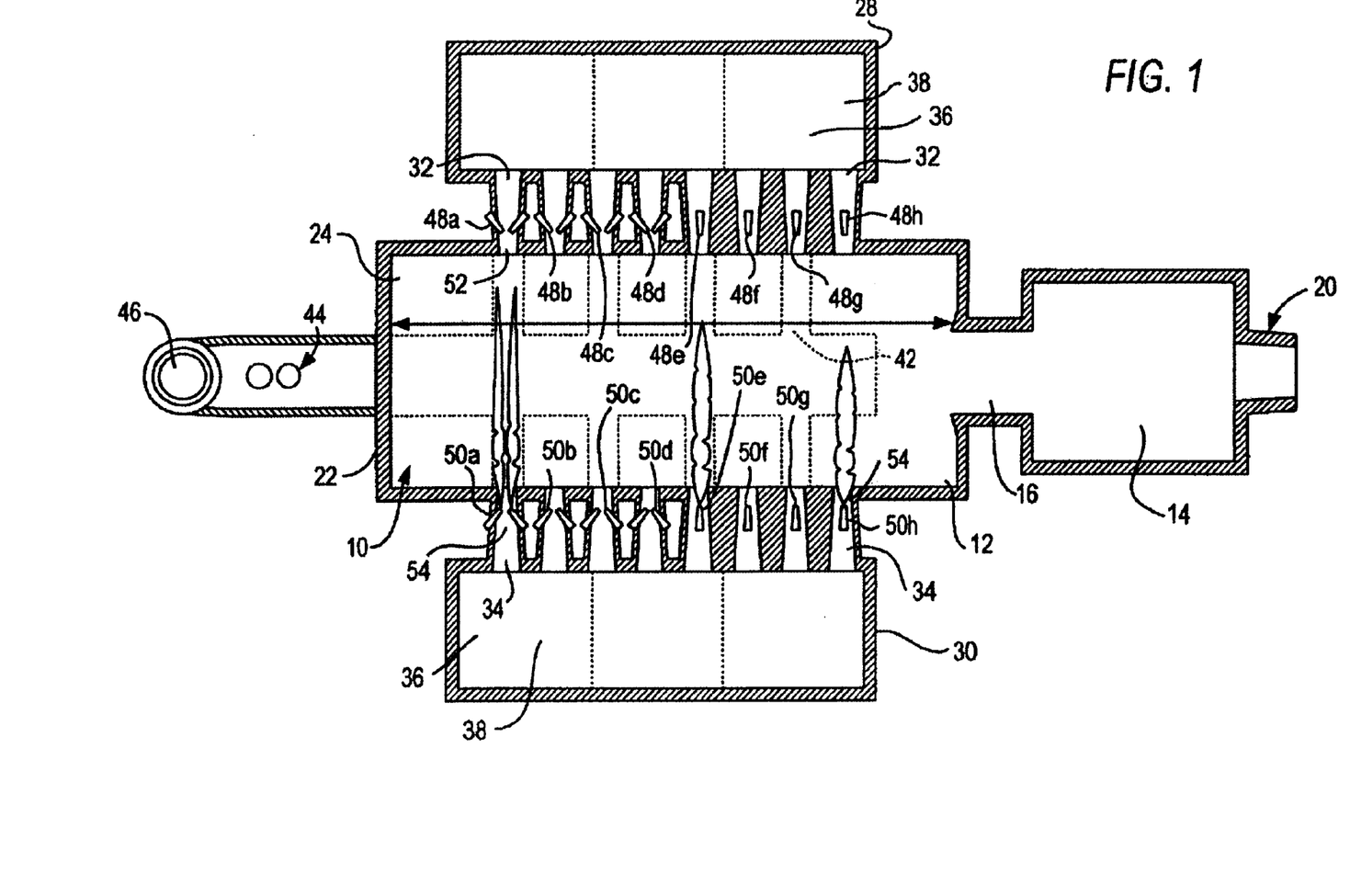
FIG. 1 is a plant view of a regenerative-type glass melting furnace.
Figure 2:
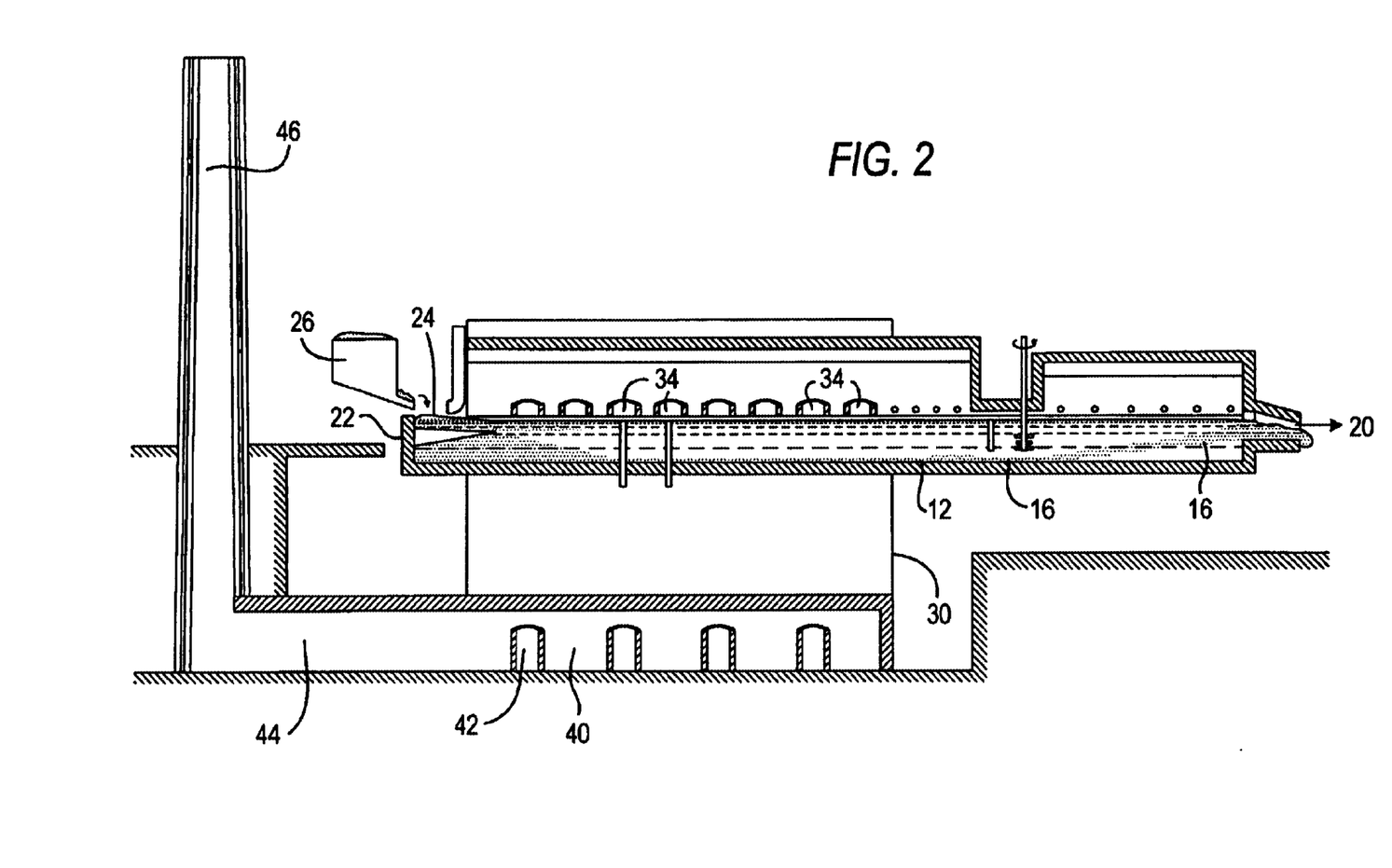
FIG. 2 is a schematic longitudinal view of the furnace illustrated in figure

The invention will be described now in relation to a specific embodiment, wherein the same parts will be referred to the same numbers and wherein the FIGS. 1 and 2 shows a plant view of a regenerative-type glass melting furnace which comprises a melting chamber 10, a refining chamber 12, a conditioning chamber 14 and a throat 16 between the refining chamber 12 and the conditioning chamber 14. At a front end 18 of the refining chamber 12 comprises a series of forehearth connections 20 through which molten glass is removed from the refining chamber 12. The rear end 22 of the melting chamber 10 including a dog house 24 through which glass making materials are fed by means of a batch charger 26. A pair of regenerators 28, 30, are provided by each side of the melting chamber 10. The regenerators 28 and 30 are provided with firing ports 32, 34, connecting each regenerator 28, 30, with the melting chamber 10. The regenerators 28, 30 are provided with a gas regenerator chamber 36 and an air regenerator chamber 38. Both chambers 36 and 38 are connected to a lower chamber 40, which is arranged to be communicated by means of dampers 42 toward a tunnel 44 and a chimney 46 for the exhaust gases. Burners 48a, 48b, 48c, 48d 48e, 48f, 48g and 48h, as well as burners 50a, 50b, 50c, 50d, 50e, 50f, 50g and 50h are arranged by each port 32, 34, in a neck portion 52, 54, of each firing ports 32, 34 in order to bum fuel, as natural gas, petroleum coke or other type of fuels for use in the glass melting furnace.

So, when the glass making materials are fed through the dog house 24 in the rear end of the melting chamber 10, the melting glass is melted by the burners 48a–h, 50 a–h, and floats in a forward direction until completely melting to pass from the melting chamber 10 to the conditioning chamber 14. During the operation of the furnace, the regenerators 28, 30 are cycled alternately between combustion air and exhaust cycles. Every 20 minutes, or 30 minutes, depending on the specific furnaces, the path of the flame of a series of burners 48a–h or 50a–h are reversed. So, the resultant flame and products of combustion produced in each burner 48a–h, 50a–h, pass across the surface of the melting glass, and transfer heat to that glass in the melting chamber 10 and refining chamber 12.

Feeding the Pulverized Fuel

Figure 3:
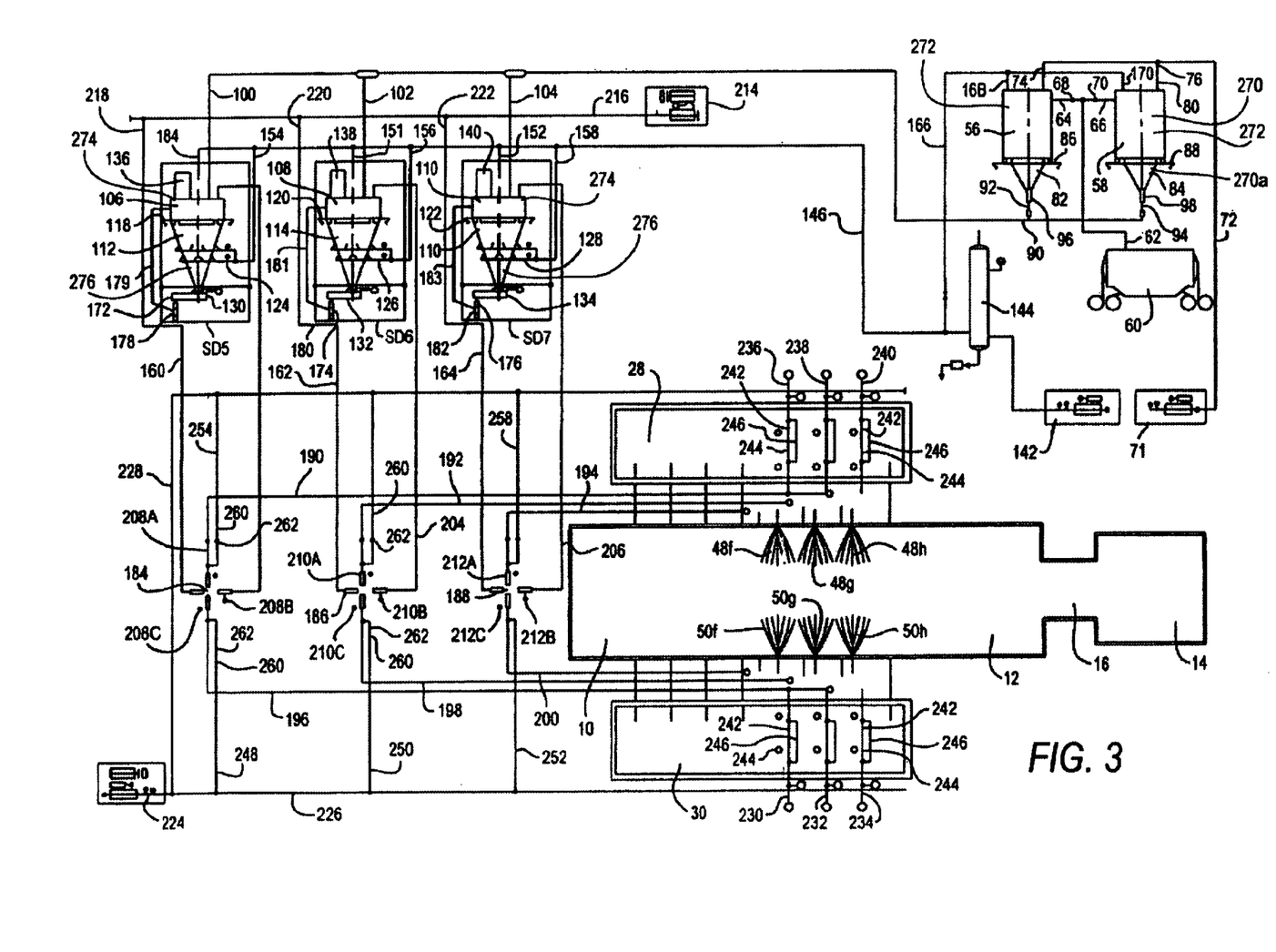
FIG. 3 is a schematic view of the system for feeding and burning a pulverized fuel in accordance with the present invention.
Figure 4:
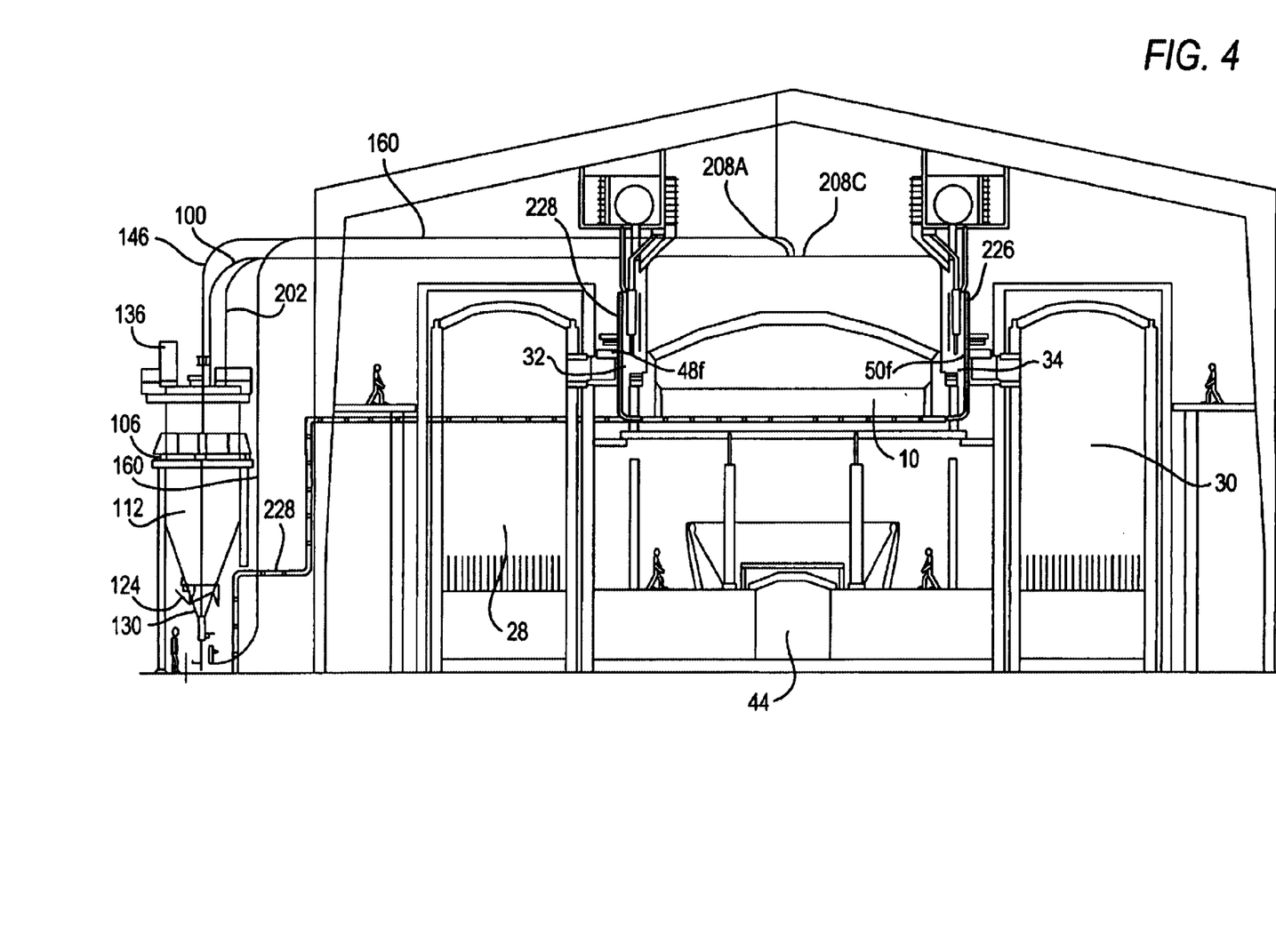
FIG. 4 is a lateral view of the system for feeding and burning a pulverized fuel in combination with the regenerative-type glass melting furnace.
Figure 5:
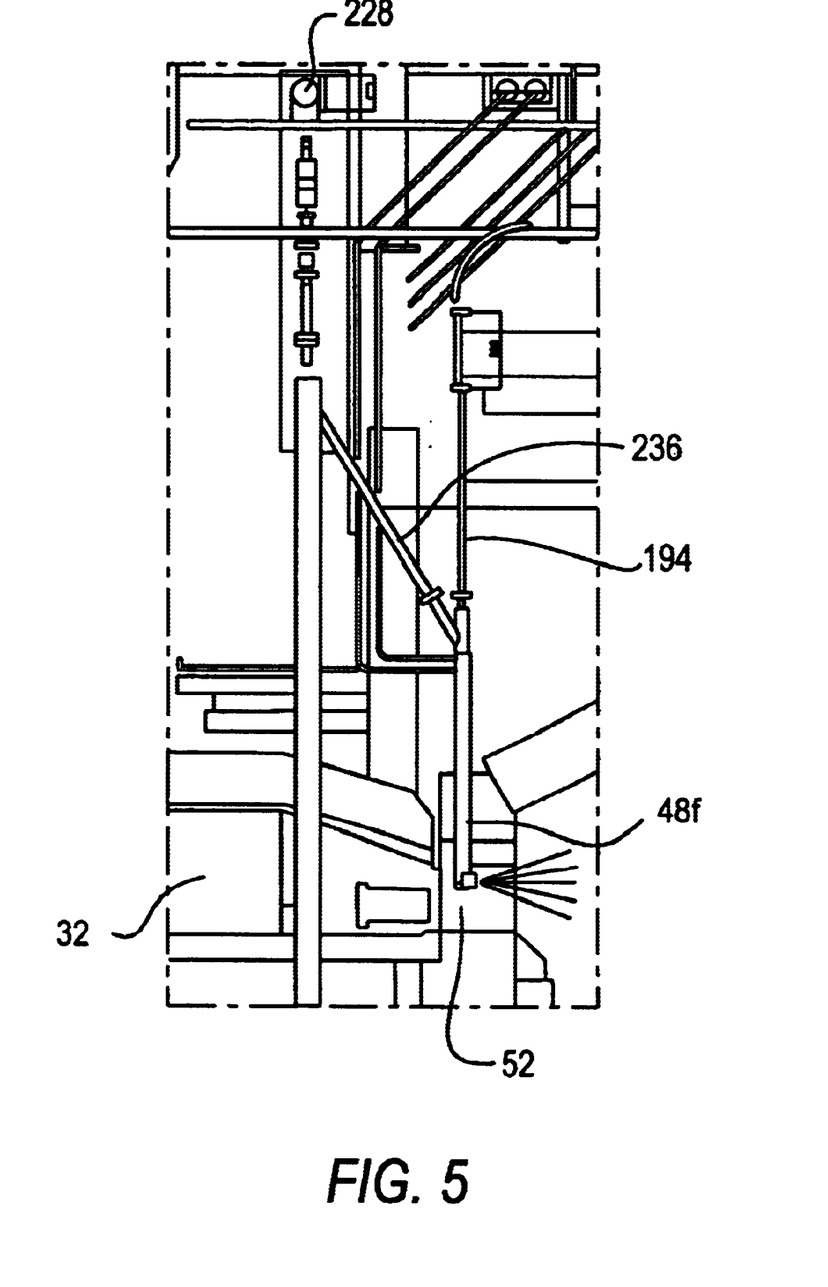
FIG. 5 is a detailed view of an arrangement of a burner for feeding and burning a pulverized fuel in accordance with the present invention.

Making now reference to FIGS. 3, 4 and 5, the system for feeding and burning a pulverized fuel in a glass melting furnace comprises, first storage silos or tanks 56 and 58 for store pulverized fuel or other type of fuel for use in the glass melting furnace. The storage silos 56, 58 are fed through of a wagon or wagon train 60 by means of a first inlet pipe 62 connected between the wagon train 60 and the silos 56, 58. The first main pipe 62 having first branch pipes 64, 66, which are connected respectively to each silo 56, 58, for the filling of each silo 56,58. Valves 68, 70 are connected to each first branch pipe 64 and 66 to regulate the filling of each silo 56, 58. Each silo 56, 58 are filled by means of a vacuum effect through of a vacuum pump 71 by means of a first outlet pipe 72. The first outlet pipe 72 having second branch pipes 74, 76, to be connected with each silo 56,58. Valves 78, 80 are connected by each second branch pipes 74, 76, to regulate the vacuum effect provided by the vacuum pump 71 for the filling of each silo 56, 58.

At the bottom of each silo 56, 58, a conical section 82, 84, and a gravimetric fuel feeding system 86, 88, are included for fluidizing and for assuring a constant discharge flow of the pulverized fuel into a second outlet pipe 90 where the pulverized material is forwarded to a solid fuel feeding system SD-5, SD-6 and SD-7. The silos 56, 58, including sensors S for determining the carbon monoxide concentration of the pulverized fuel to trigger an inertization device for protecting the internal environment inside each silo. The second outlet pipe 90 including a third branch pipes 92, 94, connected to the bottom of each conical section 82, 84 of each silo or tank 56, 58. Valves 96, 98, are attached to each third branch pipe 92, 94, to regulate the flow of the pulverized fuel to the second outlet pipe 90.

Feeding System for the Pulverized Fuel

Making now reference to the feeding system in accordance with the present invention, the pulverized fuel is received in each pulverized fuel feeding system SD-5, SD-6 and SD-7 through the second outlet pipe 90. Fourth branch pipes 100, 102 and 104, are connected to the second outlet pipe 90, in order to transport the pulverized fuel of the first silos or tanks 56 and 58 toward the pulverized fuel feeding system SD-5, SD-6 and SD-7. Each pulverized fuel feeding system SD-5, SD-6 and SD-7, including a second series of silos or tanks 106, 108, 110. The second series of silos 106, 108, 110, comprising a conical section 112, 114, 116; a gravimetric feeding system 118, 120, 122, including load cells for weight the pulverized fuel as a part of said gravimetric feeding system; an aeration system 124, 126, 128; a feeder 130, 132, 134; and a dust collector 136, 138 and 140. Said dust collectors 136, 138 and 140 including sensors DC for monitoring unfavorable dust conditions. Each pulverized fuel feeding system SD-5, SD-6 and SD-7 being provided to carry out a consistent discharge flow of the pulverized fuel, as well as, the correct amount of pulverized fuel/air required by the process toward each one of the burners 48f, 48g, 48h and burners 50f, 50g and 50h, as will be described later.

A pneumatic air compressor 142 and an air tank 144 are connected by means of a second main pipe 146. A first inlet branch pipes 148, 150, 152, are connected with the second main pipe 146 for supplying a filtered air through of the filters 136, 138 and 140—to transport the pulverized fuel toward the interior of each second series of silos or tanks 106, 108, 110. The second main pipe 146 also includes a first return branch pipes 154, 156, 158, that are connected with each aeration system 124, 126, 128, for permitting an adequate flow of the pulverized fuel toward a third outlet pipes 160, 162, 164, as will described later. Additionally, a second inlet pipe 166 is connected with the second main pipe 146—after of the air tank 144—, which includes second inlet branch pipes 168, 170, that are connected on the upper part of each silo or tank 56, 58, for injecting air toward the interior of each silo or tank 56, 58.

The pulverized fuel feeding system SD-5, SD-6 and SD-7 including fourth outlet pipes 172, 174, 176, connected below of each feeder 130, 132, 134. A three-way diverter valve 178, 180, 182, is connected respectively with the fourth outlet pipes 172, 174, 176, through a first way; a second way is connected with first return pipes 179, 181, 183, for returning the pulverized fuel toward each second series of silos or tanks 106, 108, 110 during reversal cycle, which corresponds to the time when no firing in the furnace takes place; and finally the third way is connected with the third outlet pipes 160, 162, 164, which are used to supply an air-fuel mixture toward an arrangement of a four-way pipe 184, 186 and 188 related with the combustion system which is now described.

Combustion System

Making now reference to the combustion system, this is connected to each pulverized fuel feeding system SD-5, SD-6 and SD-7 through of a first way of the four-way pipe 184, 186 and 188, which are connected with each third outlet pipes 160, 162, 164 of each pulverized fuel feeding system SD-5, SD-6 and SD-7. A second way is connected respectively with fourth outlet pipes 190, 192, 194, for feeding the supply air-fuel mixture toward the burners 48h, 48g and 48f. A third way of the four-way pipe 184, 186 and 188, is connected to fifth outlet pipes 196, 198, 200 for feeding the air-fuel mixture toward the burners 50h, 50g and 50f; and a four outlet of the four-way pipe 184, 186, 188, is connected respectively to second return pipes 202, 204, 206, for returning the pulverized fuel toward each of the second series of silos or tanks 106, 108, 110. The four-way pipe 184, 186 and 188 having ball valves 208 A to C, 210A to C, 212A to C, or any other set of valves that allows the way to redirect the conveying air and the pulverized fuel mixture from the left side to the return line, as well as, to the right side of the furnace, between a connection portion of the four-way pipe 184, 186 and 188 and the fourth outlet pipes 190, 192, 194; the fifth outlet pipes 196, 198, 200; and the second return pipes 202, 204, 206.

So in this way, during the operation of the furnace, the burners 48a-to-h or 50a-to-h are cycled alternately between combustion and non-combustion cycles. Every 20 minutes, or 30 minutes, depending on the specific furnaces, the path of the flame of a series of burners 48a-to-h or 50a-to-h are reversed. The air-fuel mixture that is arriving through the third outlet pipes 160, 162, 164, is regulated by the four-way pipe 184, 186 and 188 and ball valves 208A-to-C, 210A-to-C, 212A-to-C, for alternating the injection of the air-fuel mixture between the burners 48a-to-h and 50a-to-h. When the alternately operating cycle between the burners 48a-to-h and 50a-to-h is carried out, an amount of air-fuel is returned to the second series of silos or tanks 106, 108, 110 by means of the second return pipes 202, 204, 206.

The supply air that is supplied through the third outlet pipes 160; 162, 164, is used for transporting the pulverized fuel, for generating high velocities of injection toward the nozzle of the each burner 48a-to-h and 50a-to-h. The conveying air for the pulverized fuel is supplied by means of a pneumatic supply air blower 214 through a third main pipe 216.

Fourth outlet pipes 218, 220 and 222 are connected with the third main pipe 216 and the third outlet pipes 160, 162, 164, for maintaining an elevated relation of the fuel-air mixture that is being supplied to the burners 48a-to-h and 50a-to-h.

For effectuating the combustion cycle of the burners 48a-to-h or 50a-to-h, each burner 48a-to-h or 50a-to-h are fed individually with the air-fuel mixture. This mixture will supplied through an internal tube of each burner 48a–h or 50a–h, and will arrive to a distribution chamber to be distributed to the diverse injection nozzles of each burner 48a–h or 50a–h.

For increasing the turbulence of the flows and the mixture of the pulverized fuel with a pre-heated combustion air in each burner 48a–h or 50a–h, a primary air is injected from a primary air blower 224, which is supplied under pressure through of the injection nozzles of each burner 48a–h or 50a–h. So, the operation of the burners 48a–h or 50a–h, will have a injection of pulverized fuel through of pneumatic transportation with an elevated relation solid-air and with an relation of primary air of approximately 4% of a stoichiometric air.

A sixth outlet pipe 226 and a seventh outlet pipe 228 is connected with the primary air blower 224. The sixth outlet pipe 226 being connected with fifth branch pipes 230, 232, 234 and the seventh outlet pipe 228 being connected with sixth branch pipes 236, 238, 240. The exit end of each fifth and sixth branch pipes 230, 232, 234, 236, 238, 240, being connected in a direct way with each burner 48f-to-h or 50f-to-h. The flow of primary air in each fifth and sixth branch pipes 230, 232, 234, 236, 238, 240, are regulated individually by an arrangement of a first glove valve 242, a first ball valve 244 and a second glove valve 246.

Additionally, the sixth outlet pipe 226 includes seventh outlet pipes 248, 250 and 252, which are connected respectively with the fifth outlet pipes 196, 198, 200. And, the seventh outlet pipe 228 includes sixth outlet pipes 254, 256, 258, which are connected respectively with the fourth outlet pipes 190, 192, 194. Each sixth and seventh outlet pipes 248, 250, 252, 254, 256, 258, having a check valve 260 and a ball valve 262.

Through the arrangement above described, the primary air blower 224 will supply primary air to the burners 48f-to-h (left burners) or burners 50f-to-h through the sixth outlet pipe 226 and the seventh outlet pipe 228 and by each fifth and sixth branch pipes 230, 232, 234, 236, 238, 240. The air blower 224 will operate to supply a maximum air flow during the operation of each burner 48f-to-h or burners 50f-to-h, meanwhile a minimum air flow will be provide for the burners 48f-to-h or burners 50f-to-h that are not operating by means of each sixth and seventh outlet pipes 248, 250, 252, 254, 256, 258, to guarantee the better conditions to be cooled.

Notwithstanding that the invention was described over the basis of three burners 48f, 48g, 48h and burners 50f, 50g and 50h, it should be understood that the system described in the present invention is applied for all the burners 48a-to-h and 50a-to-h. FIG. 5 shows a specific arrangement of a burner 48f, sixth branch pipe 236, fourth outlet pipe 194 and the seventh outlet pipe 228, the last being connected with the primary air blower 224, for feeding and burning a pulverized fuel in accordance with the present invention. The burner 48f is located in a neck portion 52 of a firing port 32 in order to burn a fuel, such as, natural gas, petroleum fuel or other type of fuels for use in the glass melting furnace. In an additional embodiment of the present invention, the melting of glass can be melted with two or three types of fuel, for example, in FIG. 1, the burners 48a–48d and 50a–50d can be fed with a pulverized fuel; and the burners 48e–48h and 50e–50h can be fed with gas or fuel oil. In a third embodiment of the present invention, the burners 48a–48d and 50a–50d can be fed with a pulverized fuel; the burners 48e–48f and 50e–50f can be fed with gas; and the burners 48g–48h and 50g–50h can be with fuel oil. These combinations are considering that at this date already exists glass melting furnaces that uses gas or fuel oil as the main fuel for melting glass, and that the behavior of said gas and fuel oil is well known in the art.

Environment Control

Finally, after of the combustion of the pulverized fuel in the glass melting furnace has been carried out, an equipment for reducing and controlling the air pollution and emissions of sulfur, nitrogen vanadium, iron and nickel compounds at the atmosphere is placed at the end of the tunnel 44 and connected with the chimney 46 for the exhaust gases. The pollution control system according to the present invention is adapted in a waste gas outlet of the glass melting furnace.

For the control of contaminant emissions, electrostatic precipitators have proven to perform well in the abatement of glass furnace particulate matter. The fine particulate matter of glass furnaces presents no problem for electrostatic precipitators.

In the case where $SO_2$ removal is needed in addition to particulate matter, a dry or partially wet scrubber makes a good complement to an electrostatic precipitators or a fabric filter system. In fact, under the conditions of high acid gas, a scrubber is necessary to reduce the concentration of the corrosive gases. In the case of the use of a new fuel, a scrubber will be needed to lower $SO_2$ content. It will not only serves as a benefit to the system for corrosion prevention, but it will also lower the temperature of the exhaust and therefore reduce the gas volume.

Dry scrubbing (the injection of a dry reactive powder) and semi-wet scrubbing will take place in a large reaction chamber upstream of the electrostatic precipitators. In both dry and wet, the scrubbing materials will include $Na_2CO_3$, $Ca(OH)_2$, $NaHCO_3$, or some others. The resultant reaction materials are basic ingredients to the glass making process and therefore are generally recyclable up to a point. A rule of thumb is that for every 1% of sulfur in the fuel, there will be about 4 pounds of $SO_2$ generated per ton of glass melted. So, for high sulfur fuels there will be an abundance of dry waste, $NaSO_4$ for example. This amount of waste will vary with the capture rate and the amount of material that can be recycled, but the number will be significant. For the float furnace operating with high sulfur fuel there might be up to 5 tons of waste per day.

The performance levels of scrubbing vary from 50% to 90% using dry $NaHCO_3$ or semi-wet $Na_2CO_3$. Temperature control is important in ally scrubbing alternative with target reaction temperatures ranging from about 250° C. to 400° C. on the scrubbing material.

Wet scrubbers come in an almost infinite number of shapes, sizes and applications. The two major applications, relating to glass making are those that are designed to collect gases ($SO_2$), and those that are designed to capture particulate matter.

Detailed Description of the Control System

Making now reference to the control system of the present invention, this will be described in combination with the system for feeding and burning a pulverized fuel, as it was described in FIGS. 1 through 5, in order to control all the operation sequence of said system in accordance with alternated firing cycles of the pulverized fuel.

Figure 6:
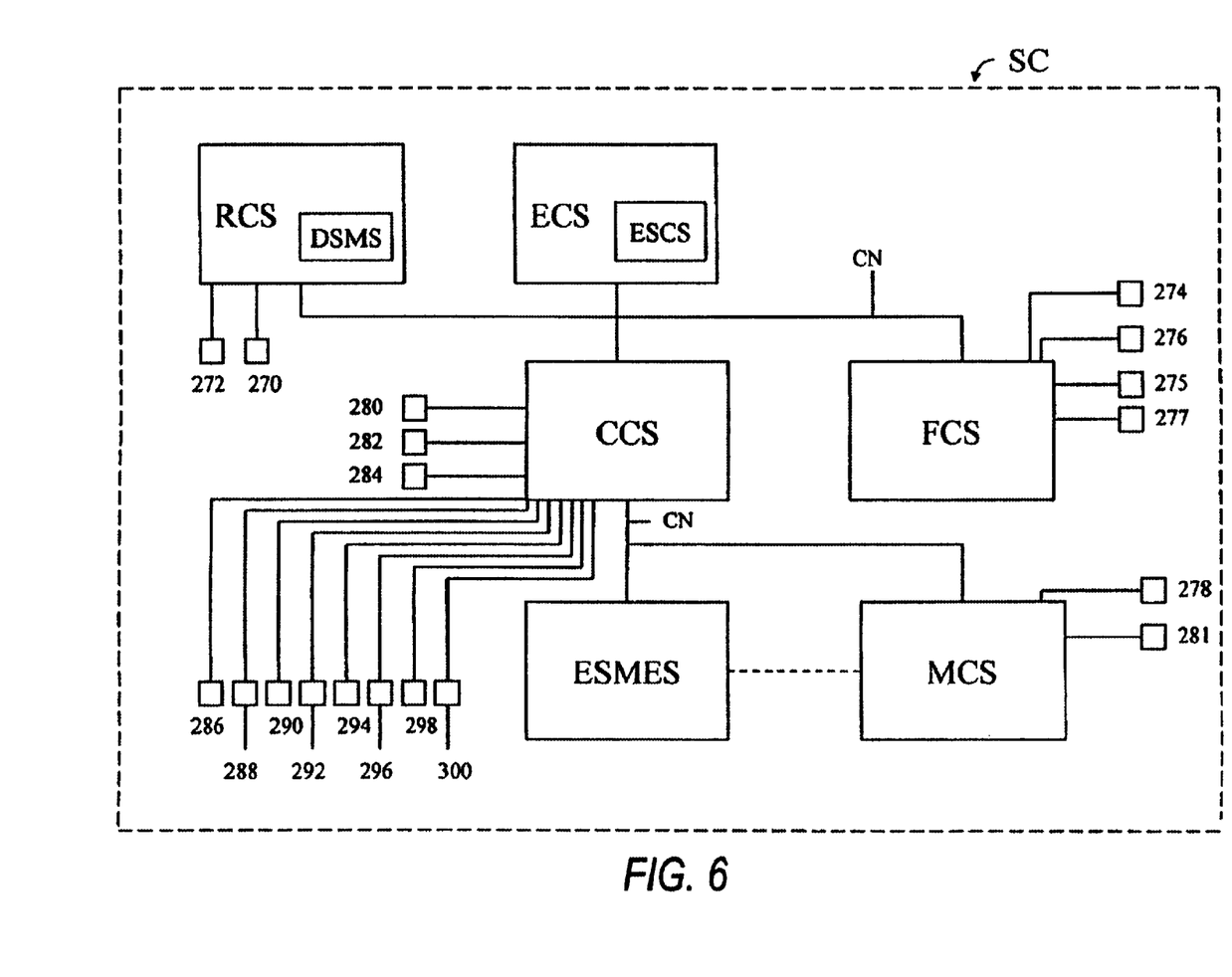
FIG. 6 is a block diagram of the main parts of the control system built in accordance with the present invention; and, FIG. 7 is a flow chart explaining the operation of the control system shown in FIG. 6.

The control system CS of the present invention as it is illustrated in FIG. 6, comprises the following: a reception storage and conveying control system RCS, for monitoring the filling of each silo 56, 58. Said reception storage and conveying control system RCS, including level sensors 270*a* for detecting an upper level and lower level of the pulverized fuel in each silo 56, 58. Once that the upper level or lower level of pulverized fuel is detected in each silo 56, 58, signals are sent to the reception storage and conveying control system RCS for stopping or starting up the filling action in each silo 56, 58. Additionally, each silo 56, 58, includes sensors 272 located in top of each silo for measuring the concentration of carbon monoxide in order to trigger safety procedures for inertization of the internal atmosphere in each silo 56, 58.

A feeding control system FCS is associated with the pulverized fuel feeding systems SD-5, SD-6 and SD-7 for controlling alternately the filled up and discharge of the second series of silos 106, 108, 110. The feeding control system FCS controls automatically the filling of the pulverized material in one or two embodiments. In a first embodiment, the level control of the pulverized material in the systems SD-5, SD-6 and SD-7, is carried out through of the gravimetric feeding system 118, 120, 122, that is, the feeding control is calculated taking in consideration the time versus the weight of the pulverized material that is being detected in the silos 106, 108 and 110. So, each time that a minimum weight of pulverized fuel is detected in each silo 106, 108 and 110, these will be filled up with the pulverized material. In a second embodiment, the level control of the pulverized material is controlled by the use of level sensors. At least a first level sensor 274 is placed in the upper part of the pulverized fuel feeding systems SD-5, SD-6 and SD-7 and at least a second level sensor 276 is placed iri the lower part of said pulverized fuel feeding systems SD-5, SD-6 and SD-7. The first level sensor 274 and the second level sensor 276 are associated with the feeding control system FCS to receive and to generate signals of the level of pulverized material and for the filling up of the pulverized fuel feeding systems SD-5, SD-6 and SD-7. The feeding control system FCS also includes sensors, 275 for monitoring the air flow, as well as, air pressure in the primary air blower 214, and sensors 277 for monitoring air flow, as well as, air pressure and temperature for the conveying air in the pipes 160, 162 and 164. Through of the gravimetric feeding system 118, 120, 122, or by means of the sensors 274, 275, 276 and 277, a series of variables are detected, for example, conveying air temperature, conveying air pressure, conveying air flow rate, rotary valve feedback speed 279, weight of the pulverized fuel in the pulverized fuel feeding systems SD-5, SD-6 and SD-7, conveying air blower control start/stop, etc.

A melter control system MCS, for handling the critic variables of the glass melting furnace, said melter control system MCS being associated with a plurality of sensors, such as: sensors 278 for monitoring the furnace internal temperature and sensors 280 for monitoring the temperature profile in all the furnace.

An environmental control system ECS, for handling the extraction of the combustion gases, in a safe and controlled manner. This is, when the extraction of the gases is carried out, a direct impact is performed on the internal pressure of the glass melting furnace, so that, here is very important that a combustion control system CCS (which be described later), regulates the interaction between the melter control system MCS and the environmental control system ECS, to calculate the intermediate variables during the extraction of the combustion gases through of the combustion air and exhaust heat cycles of the regenerative furnace, in order to minimize the variations in the furnace.

An environmental services control system ESCS associated with the environmental control system ECS, to generate the proportions of reactives that are requested by the environmental control system ECS, as well as, the handling of the solid waste that has been recovered in each of the environmental control systems ECS.

And finally, a combustion control system CCS, for controlling the alternation between combustion air and exhaust heat cycles in the glass melting furnace (every 20 minutes, or 30 minutes, depending on the specific furnaces). The combustion control system CCS is connected with all the control systems above described (the reception storage and conveying control system, RCS, the feeding control system FCS, the melter control system MCS, the environmental control system ECS and the environmental services control system ESCS), for receiving and processing all the control variables involved in each of the controls, such as, sensors 280 for monitoring the gas flow in each burner; sensors 282 for monitoring the pulverized fuel feeding velocity in the pipe 90, sensors 284 for monitoring the air feeding velocity in the primary air blower 224; sensors 286 for monitoring the air pressure in the primary air blower 224; sensors 288 for monitoring the transportation air flow in the sixth outlet pipe 226 and the seventh outlet pipe 228; sensors 290 for monitoring the internal pressure of the combustion chambers; sensors 292 for monitoring the gas extraction velocity in the chimney; sensors 294 for monitoring the gas pressure in the exit and entrance of the environmental control system ECS; sensors 296 for monitoring the furnace internal temperature; sensors 298 for monitoring the temperature in the combustion chambers; and sensors 300 for determining a temperature profile in all the furnace. Each sensor being connected with the combustion control system CCS, which receives feedback signals from all the above described sensors, in order to accurately control the operation of the most critical variables of the feeding and burning system of the pulverized fuel. This combustion control system CCS is operated to carry out the following operations: direct combustion control; interaction between the combustion control system CCS and melter combustion control system MCS (reversal synchronization); for monitoring all the process variables such as, internal pressure from furnace and set-point, combustion air flow rate and set-point, % excess $O_2$, and gas flow rate and set-point; interaction between combustion control system CCS and feeding control system FCS; and the interaction between combustion control system CCS and environmental control system ECS.

The operation sequence of said combustion control system CCS is initiated taking as reference the position of the furnace gates FG and the position of tunnel gates TG, in order to establish a correct synchronization with the operation of the furnace and for introducing the pulverized fuel in the correct side of the glass melting furnace in accordance with the combustion air and exhaust heat cycles.

All and each one of the sensors sending respectively signals to the combustion control system CCS through of a communication network CN, in order to enable the control, for calculating the duration of the cycle of operation of each series of burners on the basis of the signal produced by the sensors 298 located in the furnace gates FG.

The reception storage and conveying control system RCS, also includes a day-silo monitor system DSMS, for monitoring the amount of pulverized fuel in each silo 56, 58.

The control system SC also includes an expert system and manufacturing execution system ESMES, which is used to optimize the overall combustion and production process.

Under this arrangement, the feeding of pulverized material toward each of the burners can carried out in two embodiments.

Intermittent Reversal Sequence

In a first embodiment, the pulverized fuel can be fed to the furnace in an intermittent sequence. In this case, in a first step, once that the combustion cycle has finished in one side of the furnace, the feeding of pulverized fuel to each of the burners,—for example burners 48$f$, 48$g$, 48$h$, by means of the pulverized fuel feeding systems SD-5, SD-6 and SD-7— are stopped. However, a continuous flow of the conveying air is maintained during a short period of time "as a purge" for cleaning purposes for that said pipes 192, 194 and 196. In this embodiment, the flow of the pulverized fuel is totally stopped in the pulverized fuel feeding systems SD-5, SD-6 and SD-7, meanwhile the combustion cycle is being changed from the burners 48$f$, 48$g$, 48$h$ to the burners 50$f$, 50$g$ and 50$h$ to carry out a second combustion cycle. In this step, the furnace gates FG are open to initiate the feeding of pulverized fuel, for example toward burners 50$f$, 50$g$, 50$h$. In this second step, once the opposite side of the furnace is ready to start the combustion process, the arrangement of valves 242, 244 and 246, are open, and the feeding of the pulverized fuel is reinstated through the pulverized fuel feeding systems SD-5, SD-6 and SD-7, once the conveying air is in the pipe by means of the pulverized fuel feeding systems SD-5, SD-6 and SD-7. The process of change is repeated each 20 or 30 minutes between combustion air and exhaust heat cycles in the glass melting furnace. Also, in this case, the pulverized fuel feeding systems SD-5, SD-6 and SD-7 can include a slide gate SG in the output of said pulverized fuel feeding system SD-5, SD-6 and SD-7 which is synchronized with the combustion control system CCS in order to avoid the stooping and restarting of pulverized fuel feeding systems SD-5, SD-6 and SD-7.

Continuous Reversal Sequence

In a second embodiment, the operation of the pulverized fuel feeding systems SD-5, SD-6 and SD-7, is maintained in a continuous form, in order to maintain a major and better stability in the feeding of the pulverized fuel to each of the burners. The arrangement is similar to previous example, but here is used the four-way valve 184, 186, 188 above described or a three way diverter valve that perform the same operation (not shown). Through this embodiment, the feeding of the pulverized fuel can be previously tested, calibrated and set up before said fuel be fed to each the burners 48$a$-to-$h$ or 50$a$-to-$h$.

In this way, the air-fuel mixture that arrives through the third outlet pipes 160, 162, 164, is regulated by the four-way set of valves 184, 186 and 188 and ball valves 208A-to-C, 210A-to-C, 212A-to-C, for alternating the injection of the air-fuel mixture between the burners 48$a$-to-$h$ and 50$a$-to-$h$. So, during the cycle change, meanwhile the furnace gates FG are being opened to initiate the feeding of pulverized fuel—in a first side of the furnace—the pulverized fuel is being continuously fed through the pipes 160, 162 and 164, but said pulverized fuel is being returned to the second series of silos or tanks 106, 108, 110 by means of the second return pipes 202, 204, 206. Once that the opposite side of the furnace is ready to start the combustion, the valves 184, 186 and 188, are activated automatically for feeding the pulverized fuel to each of one of the burners.

Figure 7:
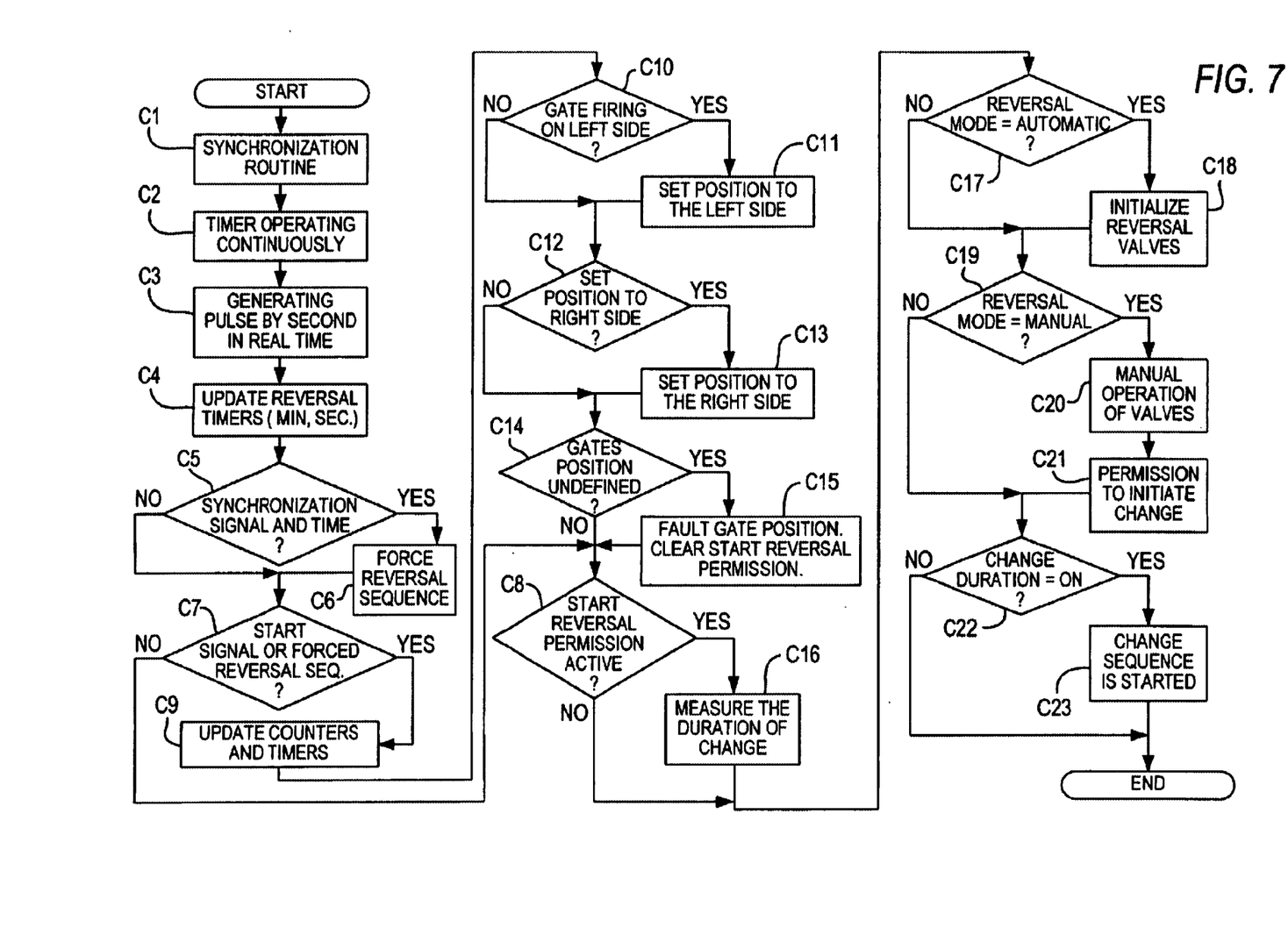

The basic sequence to carry out the reversal routine in the combustion control system CCS is showed in the flow chart in FIG. 7. The reversal sequence is controlled by the combustion control system CCS. The mix of airpulverized fuel is switched from one series of burners to others through the valves. 184, 186 and 188, to feed the mix of air-pulverized fuel to each series of burners. The signals detected by the control system are used by the feeding control system FCS in order to perform special control strategies to carry out a better feeding stability during reversal firing in base to the position of the furnace gates FG.

In a sequence of steps, the reversal routine is started when the control system SC (Step C1) receives an internal or external signal for staring or stopping of the cycle time. The signals is received and transmitted to a timer (Step C2)—for reference of the reversal, which is operating continuously, generating a square wave signal of 500 milliseconds—. In Step C3, each positive transition of said signal is used to generate a pulse of one second "in real time" in order to synchronize the overall scan form a processor of the control system SC. In step C4 each second is used to actualize; the remaining seconds for initiating the change (every 20 minutes, or 30 minutes, depending on the specific furnaces, the path of the flame is reversed); the remaining minutes for initiating the reversal; the minutes that have passed after the reversal; and the seconds that have passed after the reversal. In Step C5, if synchronization signal and the time that have passed is equal or bigger than the estimated time for the change, if is YES, then, a signal is generated to force the initiation of the change (Step C6). If NOT, then, signal is sent to Step C7 to initiate the change. Additional safety interlocks not showed in this routine avoid false trigger of the reversal sequence. This synchronization routine is carried out for each of the furnace gates FG. After of Step C5 and Step C6, and once the signals to initiate the reversal or to force the reversal have been received in Step C7, these are compared with respect to the duration of the change. If NOT, it goes to the next step (Step C8) to obtain a permission to initiate the change. If these are equal, then the routine continues with the Step C9 to actualize the counters in accordance with the position of the furnace gates FG and continue with the Step C10. In Step C10 the position of left furnace gates FG is compared. If the position of the left furnace gates FG are correct, then the burned position is on the left side (Step C11) and continues to the Step C12; if NOT, then the position of the right furnace gates FG are compared (Step C12). In the Step C12 the position of the right gates FG is compared. If the position of the right gates FG is correct, the burned position is on the right side (Step C13), and after continues to the Step C14. If NOT, it continues with step C14. In Step C14 a comparison of the furnace gates FG (left gates and right gates) is carried out in order to avoid the possibility that the furnace gates are in a non-defined position. If the position of the furnace gates FG is defined then continues to the step C8 to initiate an operation to carried out a sequence of change from a furnace gate FG to the other, for example from the right furnace gates to the left furnace gates; if NOT, then goes to Step C15. In this step C15 if a fail in the position of the furnace gates FG is, detected, permission to change of position of the furnace gates FG is carried out manually. The sequence continues to the step C8.

In step C8, permission to initiate the change of the furnace gate FG is requested. If the sequence of change is authorized, then continues with step C16 measuring the duration of the change, and continues with step C17. If NOT, then it goes directly to step C17, wherein the automatic operation mode is compared. In step C17, if the operation mode is automatic, then it goes to the step C18 to initiate a start of the valves 184, 186, 188, and continues with step C19 (wherein the manual operation mode is compared). In the Step C19 if the operation mode is manual, then it goes to the step C20 to initiate the manual operation of the valves 184, 186, 188. After of step C20, continues the step C21, wherein a permission to initiate the change of the furnace gates FG is in position OFF. In step C22, a measure of the change duration in the port is requested. If the change duration in the port is ON, then the change sequence is started (step C23) and after, the program is ended (C24). If the change duration in the port is not ON, then the process is terminated (step C24).

From the above, a control system for controlling the feeding and burning of a pulverized fuel in a glass melting furnace has been described and will apparent for the art that many other features o improvements can be made, which be considered within the scope determined by the following claims.

I claim:

1. A method of controlling a system for feeding and burning a pulverized fuel of the type that comprises a glass melting furnace, a series of burners arranged in said glass melting furnace which are used alternately to carry out combustion and non-combustion cycles for the melting of the glass; at least a storage silo for storing and feeding the pulverized fuel; and at least a pulverized fuel feeding system which is filled up and emptied out with said pulverized material for providing a constant flow of said pulverized fuel to each of the burners during the class melting process, the method including the steps of:

monitoring at least one operating variable involved in said lass melting furnace, which is based on at least a sensor, each sensor detecting a different variable during the glass melting process;

monitoring and controlling the filled up and emptied out of said pulverized fuel feeding system based on the amount of pulverized fuel that is storaged in said pulverized fuel feeding system, providing a constant flow of said pulverized fuel to each of the burners;

controlling the alternation of the combustion and non-combustion cycles in said burners of said glass melting furnace, based on the monitoring of the amount of pulverized fuel that is being fed to the burners and in said operating variables of the glass melting process; and calculating the alternation of the combustion and non-combustion cycles of said burners based on a real time.

2. The method of controlling a system for feeding and burning a pulverized fuel as claimed in claim 1, wherein the step of controlling the alternation of the combustion and non-combustion cycles in said burners of said glass melting furnace comprises:

monitoring the feeding of a mix of the pulverized fuel and air flow from said pulverized fuel feeding system in at least a first burner located in a first side of the glass melting furnace;

monitoring a non-feeding of the mix of pulverized fuel and air flow in at least a second burner located in an opposite side to said at least first burner in said glass melting furnace;

activating a first cycle time to provide the mix of pulverized fuel and air to said at least first burner to carry out a first combustion step in the glass melting furnace for melting of the glass;

detecting the finishing of the first cycle time of said first combustion step and closing the supply of the pulverized fuel in said first burner, but maintaining the supply of air during a short time for cleaning of the first burners;

continuously maintaining the feeding of the pulverized fuel in said pulverized fuel feeding system by returning the feeding of pulverized fuel toward said pulverized fuel feeding system, meanwhile a flow of pulverized fuel and air is being changed from said at least first burner to said at least second burner in said second side of the glass melting furnace to carry out a second combustion cycle;

activating a second cycle time to provide the mix of pulverized fuel and air from said pulverized fuel system to at least a second burner to carry out a second combustion step in the glass melting furnace for the melting of the glass;

monitoring the feeding of the mix of the pulverized fuel and air in at least said second burner located in an opposite side to said at least first burner in said glass melting furnace for the melting of the glass;

detecting the finishing of the second cycle time of said second combustion step and closing the supply of the pulverized fuel from said pulverized fuel system in said second burner, but maintaining the supply of air during a short time for cleaning of said second burners;

continuously maintaining the feeding of the pulverized fuel in said pulverized fuel feeding system by returning the feeding of pulverized fuel toward said pulverized fuel feeding system, meanwhile the combustion cycle is being changed from said at least second burner to said at least first burner in said first side of the glass melting furnace to carry out the first combustion cycle; and, automatically changing the combustion and non-combustion cycles between said at least first burner and said at least second burner for the melting of the glass.

3. The method of controlling a system for feeding and burning a pulverized fuel as claimed in claim 2, wherein the step of automatically changing the combustion and non-combustion cycles between said at least first burner and said at least second burner for the melting of the glass is based in a programmable sequence.

4. The method of controlling a system for feeding and burning a pulverized fuel as claimed in claim 2, wherein the step of continuously maintaining the feeding of the pulverized fuel of said feeding system by returning the excess of pulverized fuel toward said pulverized fuel feeding system further includes the step of testing, calibration and setting up of the pulverized fuel feeding system.

5. The method of controlling a system for feeding and burning a pulverized fuel as claimed in claim 1, wherein the step of controlling the alternation of the combustion and non-combustion cycles in said burners of said glass melting furnace comprises:

monitoring the feeding of a mix of the pulverized fuel and air from said pulverized fuel feeding system in at least a first burner located in a first side of the glass melting furnace;

monitoring a non-feeding of the mix of pulverized fuel and an air flow in at least a second burner located in an opposite side to said at least first burner in said glass melting furnace;

activating a first cycle time to provide the mix of pulverized fuel and air flow to said at least first burner to carry out a first combustion step in the glass melting furnace for melting of the glass;

detecting the finishing of the first cycle time of said first combustion step and closing the supply of the pulverized fuel in said first burner, but maintaining the supply of air flow during a short time for cleaning of the first burners;

stopping the flow of the pulverized fuel in said pulverized fuel feeding system, meanwhile the combustion cycle is being changed from said at least first burner to said at least second burner in said second side of the glass melting furnace to carry out a second combustion cycle;

activating a second cycle time to provide the mix of pulverized fuel and air from said pulverized fuel feeding system to said at least second burner to carry out a second combustion step in the glass melting furnace for melting of the glass;

monitoring the feeding of the mix of the pulverized fuel and air in at least said second burner located in a first opposite side to said at least first burner in said glass melting furnace for the melting of the glass;

detecting the finishing of the second cycle time of said second combustion step and closing the supply of the pulverized fuel from said pulverized fuel system in said second burner, but maintaining the supply of air during a short time for cleaning of said second burners;

stopping the flow of the pulverized fuel in said pulverized fuel feeding system, meanwhile the combustion cycle is being changed from said at least second burner to said at least first burner in said first side of the glass melting furnace to carry out the first combustion cycle; and, automatically changing the combustion and non-combustion cycles between said at least first burner and said at least second burner for the melting of the glass.

6. The method of controlling a system for feeding and burning a pulverized fuel as claimed in claim 5, wherein the step of automatically changing the combustion and non-combustion cycles between said at least first burner and said at least second burner for the melting of the glass is based in a programmable sequence.

7. The method of controlling a system for feeding and burning a pulverized fuel as claimed in claim 5, wherein the step of detecting the finishing of the first cycle time of said first combustion step and closing the supply of the pulverized fuel in said first burner further includes a slide gate in an output of said pulverized fuel feeding system which is synchronized with the control system in order to avoid stopping and restarting of said pulverized fuel feeding system.

8. The method of controlling a system for feeding and burning a pulverized fuel as claimed in claim 1, further including the step of:

controlling a dust collector located in said storage silo and in said pulverized fuel feeding system, said dust collector being operated during the filled up and discharge out of said storage silo or said pulverized fuel feeding system, or when an unfavorable; dust monitoring conditions be detected by the control system.

9. The method of controlling a system for feeding and burning a pulverized fuel as claimed in claim 1, further including the step of:

determining an carbon monoxide concentration by each storage silo in order to trigger at least an inertization device and protect the internal environment inside of said silo.

10. A control system for a system for storing, feeding and burning the pulverized fuel of the type that comprises a glass melting furnace, a series of burners arranged in said glass melting furnace which are used alternately to carry out combustion and non-combustion cycles for the melting of the glass; at least a storage silo for storing and feeding the pulverized fuel; and at least a pulverized fuel feeding system which is filled up and emptied out with said pulverized material for providing a flow of the pulverized fuel to each of the burners during a glass melting process, the control system comprising:

means for controlling the filled up and discharge out of said pulverized fuel feeding system based on the measurement and monitoring of the amount of pulverized fuel that is being storaged and fed by said pulverized fuel feeding system;

means for monitoring at least one operating variable involved on said glass melting furnace, which is based on at least a sensor, each sensor detecting a different variable during the glass melting process; and, means for controlling the alternation of the combustion and noncombustion cycles of said burners in said glass melting furnace, based on the monitoring and feeding of the pulverized fuel and in said operating variables of the glass melting process;

wherein the means for controlling the filled up and emptied out of said pulverized fuel feeding system; the means for monitoring at least one operating variable involved of said glass melting furnace; and, the means for controlling the alternation of the combustion and non-combustion cycles of said burners in said glass melting furnace, are connected to a network communication means, said network communication means interconnecting the means for controlling the filled up and discharge out of said pulverized fuel feeding; the means for monitoring at least one operating variable involved on said glass melting furnace, and the means for controlling the alternation of the combustion and non-combustion cycles of said burners in said glass melting furnace, the means for controlling the alternation of the combustion and non-combustion cycles of said burners providing input and output signals for controlling the feeding and burning of the pulverized fuel in the glass melting process.

11. The control system as claimed in claim 10, wherein the control system further comprises:

means for controlling a dust collector located in said storage silo and in said pulverized fuel feeding system, said dust collector being operated during the filled up and discharge out of said storage silo and said pulverized fuel feeding system, or when an unfavorable dust monitoring conditions be detected by the control system.

12. The control system as claimed in claim 10, wherein the control system further comprises:

means for determining an carbon monoxide concentration each storage silo in order to trigger at least an inertization device and protect the internal environment inside of said silo.

13. The control system as claimed in claim 10, wherein the control system further comprises:

environmental control means for monitoring, calculating and controlling the extraction of combustion gases between combustion air and exhaust heat cycles of the glass melting furnace, in order to minimize the internal pressure variations in said glass melting furnace.

14. The control system as claimed in claim 13, wherein the environmental control means comprises:

an environmental services control system communicated with said environmental control means for generating a proportion of reactives that are requested by the environmental control means, as well as, for the handling of solid wastes that is been recovered by the environmental control means.

15. The control system as claimed in claim 10, wherein the means for controlling the filled up and emptied out of said pulverized fuel feeding system comprises, means for measuring and monitoring of a conveying air flow, means for monitoring a conveying air pressure and the conveying air; means for sensing the temperature in said pulverized fuel feeding system and means for controlling the speed of a blower in order to allow the control system to set the appropriate conveying air/fuel ratio required by the combustion process.

16. The control system as claimed in claim 10, wherein means for controlling the alternation of the combustion and non-combustion cycles of said burners in said glass melting furnace further comprises: means for monitoring the pulverized fuel flow in each burner, means for monitoring the pulverized fuel feeding velocity in a series of pipes, means for monitoring the air feeding velocity in an air blower, means for monitoring an air pressure in said air blower, means for monitoring internal pressure and temperature of the glass melting furnace, and means for monitoring a combustion gases in an environmental control means.

17. The control system as claimed in claim 10, wherein the control system further comprises:

means for controlling the filled up and discharge out of said pulverized fuel in said pulverized fuel feeding system, which are controlled with basis in a level of pulverized fuel that is being storaged in said pulverized fuel feeding system, said pulverized fuel feeding system including level sensors for monitoring and for generating signals of an upper level and a lower level of pulverized material in said pulverized fuel feeding system.

* * * * *